United States Patent
Polzin et al.

(10) Patent No.: US 7,409,875 B1
(45) Date of Patent: Aug. 12, 2008

(54) SYSTEM AND METHOD FOR DETERMINING VELOCITY OF ELECTRICALLY CONDUCTIVE FLUID

(75) Inventors: Kurt A. Polzin, Owens Cross Roads, AL (US); Valentin Korman, Huntsville, AL (US); Thomas E. Markusic, McGregor, TX (US); Boris Johann Stanojev, Stockholm (SE)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 11/862,793

(22) Filed: Sep. 27, 2007

Related U.S. Application Data

(60) Provisional application No. 60/877,015, filed on Dec. 4, 2006.

(51) Int. Cl.
*G01F 1/708* (2006.01)
(52) U.S. Cl. .................................................. 73/861.95
(58) Field of Classification Search .............. 73/861.95, 73/861.17, 202.5, 861.05
See application file for complete search history.

(56) References Cited

U.S. PATENT DOCUMENTS

| | | | |
|---|---|---|---|
| 3,425,277 A | 2/1969 | Adams | |
| 4,319,483 A * | 3/1982 | Durham et al. | .......... 73/204.15 |
| 4,440,021 A | 4/1984 | Abouchar et al. | |
| 4,491,024 A | 1/1985 | Miller, Jr. | |
| 4,532,811 A | 8/1985 | Miller, Jr. et al. | |
| 4,628,743 A | 12/1986 | Miller, Jr. et al. | |
| 4,686,856 A | 8/1987 | Vavra et al. | |
| 5,581,028 A | 12/1996 | Barth et al. | |
| 5,783,757 A | 7/1998 | Le Van Suu | |
| 5,792,952 A * | 8/1998 | Ritchart | ................... 73/204.27 |
| 6,175,688 B1 * | 1/2001 | Cassidy et al. | .............. 392/470 |
| 6,662,121 B1 | 12/2003 | Oda et al. | |
| 6,681,625 B1 | 1/2004 | Berkcan et al. | |
| 6,779,394 B2 | 8/2004 | Ambrosina et al. | |
| 6,871,537 B1 | 3/2005 | Gehman et al. | |
| 2005/0022594 A1 | 2/2005 | Padmanabhan et al. | |
| 2005/0178195 A1 | 8/2005 | Pinter et al. | |

FOREIGN PATENT DOCUMENTS

WO   WO 2004/040244 A1   5/2004

\* cited by examiner

*Primary Examiner*—Jewel V Thompson
(74) *Attorney, Agent, or Firm*—James J. McGroary; Peter J. Van Bergen

(57) ABSTRACT

A flowing electrically-conductive fluid is controlled between an upstream and downstream location thereof to insure that a convection timescale of the flowing fluid is less than a thermal diffusion timescale of the flowing fluid. First and second nodes of a current-carrying circuit are coupled to the fluid at the upstream location. A current pulse is applied to the current-carrying circuit so that the current pulse travels through the flowing fluid to thereby generate a thermal feature therein at the upstream location. The thermal feature is convected to the downstream location where it is monitored to detect a peak associated with the thermal feature so-convected. The velocity of the fluid flow is determined using a time-of-flight analysis.

20 Claims, 2 Drawing Sheets

SYSTEM AND METHOD FOR DETERMINING VELOCITY OF ELECTRICALLY CONDUCTIVE FLUID

CROSS-REFERENCES TO RELATED APPLICATIONS

This application claims the benefit of U.S. Provisional Application Ser. No. 60/877,015 filed on Dec. 4, 2006.

ORIGIN OF THE INVENTION

The invention described herein was made in the performance of work under a NASA contract and by an employee of the United States Government and is subject to the provisions of Public Law 96-517 (35 U.S.C §202) and may be manufactured and used by or for the Government for governmental purposes without the payment of any royalties thereon or therefore. In accordance with 35 U.S.C §202, the contractor elected not to retain title.

BACKGROUND OF THE INVENTION

1. Field of the Invention

This invention relates to fluid flow measurements. More specifically, the invention is a system and method for determining the velocity of an electrically conductive fluid.

2. Description of the Related Art

Measuring the velocity of a moving fluid is important or required for a variety of applications. Some applications require a high-degree of measurement precision. For example, the flow velocity of liquid metal propellants (e.g., molten bismuth) in an electric propulsion system must be measured/determined with a high-degree of mass-flow resolution. Further, the system for making such a velocity measurement/determination must be able to withstand temperatures of the liquid (i.e., molten) metal.

SUMMARY OF THE INVENTION

Accordingly, it is an object of the present invention to provide a method and system for determining the velocity of a flowing liquid metal.

Another object of the present invention is to provide a method and system for determining the velocity of a molten propellant such as molten bismuth.

Still another object of the present invention is to provide a method and system for determining the velocity of a flowing liquid metal with minimal intrusion on the flowing liquid metal.

Other objects and advantages of the present invention will become more obvious hereinafter in the specification and drawings.

In accordance with the present invention, a method and system are provided for determining velocity of a flowing electrically conductive fluid with a finite resistivity. The flowing fluid is controlled between an upstream and downstream location thereof to insure that a convection timescale of the flowing fluid is less than a thermal diffusion timescale of the flowing fluid between the upstream and downstream locations. First and second nodes of a current-carrying circuit are coupled to the fluid at the upstream location so that the flowing fluid passes therebetween. A current pulse is applied to the current-carrying circuit. As a result, the current pulse travels through the flowing fluid to thereby generate a thermal feature in the flowing fluid at the upstream location. The thermal feature is convected to the downstream location where it is monitored to detect a peak associated with the thermal feature so-convected. The velocity of the fluid flow is determined using (i) the distance between the upstream and downstream locations, and (ii) the time between the application of the current pulse to the current-carrying circuit and detection of the peak at the downstream location.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
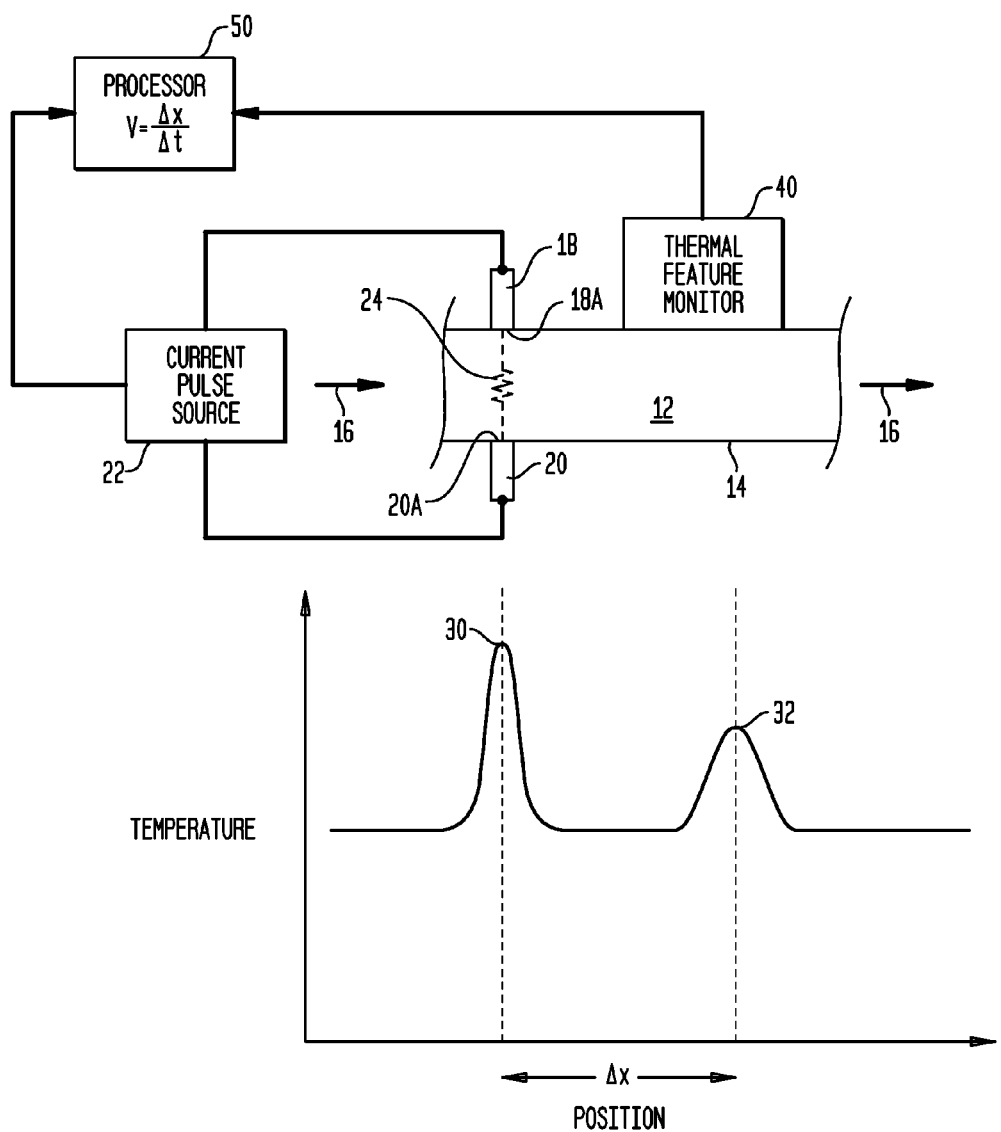
FIG. 1 is a schematic diagram of a system for determining velocity of a conductive fluid and a corresponding graph of a thermal feature generated and detected by the system in accordance with the method of the present invention.

Referring now to the drawings and more particularly to FIG. 1, a system for determining the velocity of a flowing electrically conductive fluid is shown and is referenced generally by numeral 10. It is to be understood that the present invention can be used to determine the velocity of any electrically-conductive fluid that also has a characteristic electrical resistance. For example, the fluid can be molten bismuth which is used as a propellant for Hall thrusters.

For purpose of the present invention, a fluid 12 whose velocity is to be determined is confined to a flow volume that is typically defined by a conduit 14. The flow of fluid 12 through conduit 14 is in the direction indicated by arrows 16. Passing through conduit 14 on either side thereof are the tips 18A and 20A of two electrodes 18 and 20, respectively. Ideally, tips 18A and 20A are flush with the inside wall of conduit 14 so as not to obstruct the flow of fluid 12. Further, tips 18A and 20A are typically diametrically opposed to one another to define an imaginary line extending through fluid 12 that is perpendicular to flow direction 16. Coupled to electrodes 18 and 20 is a current pulse source 22 (e.g., a capacitor discharge) capable of generating a brief (e.g., typically less than 1 millisecond) current pulse that transits fluid 12. That is, the combination of current pulse source 22, electrodes 18 and 20, and fluid 12, essentially define an electrical circuit with fluid 12 acting as an electrical resistance element disposed between circuit nodes defined by electrode tips 18A and 20A.

The electrical resistance element is indicated by dashed line 24 in the drawings. Accordingly, when a current pulse is applied to either electrode 18 or electrode 20, the current pulse exits the corresponding electrode tip, transits fluid 12, and is coupled to the other opposing electrode tip nearly instantaneously in time. Since fluid 12 is electrically resistive, the current pulse will generate a corresponding and instantaneous increase in thermal energy, i.e., a narrow region of increased fluid temperature that peaks along an imaginary line extending between electrode tips 18A and 20A. This temperature peak or spike is indicated by reference numeral 30 in the graph of temperature versus position aligned with conduit 14. The resulting pulse of thermal energy in fluid 12 forms a thermal feature in fluid 12. Using a conventional "time-of-flight" analysis, the time "Δt" it takes for this thermal feature to travel a known distance "Δx" in conduit 14 is indicative of the velocity "V" of fluid 12.

Detection of the thermal feature at a downstream location along conduit 12 is accomplished by a thermal feature monitor 40 that is located a distance Δx downstream from electrodes 18 and 20. While it is expected that the peak temperature "$T_{P0}$" of the thermal feature at the creation thereof will be greater than the peak temperature $T_{P1}$" of the thermal feature after traveling a distance Δx downstream, the present invention requires that the spatial integrity of the thermal feature be maintained so that peak temperature $T_{P1}$ can be detected. That is, the spatial integrity of the thermal feature must be maintained as it propagates from electrodes 18 and 20 to monitor 40 so that a reduced thermal feature peak 32 can be detected. In this way, the time of-flight between the two locations can be accurately determined. Accordingly, the convection timescale "$\tau_C$" of the fluid flow system should be small relative to the thermal diffusion timescale "$\tau_D$" of the fluid flow system. The convection timescale $\tau_C$ is the ratio of the characteristic device length "L" (i.e., the distance Δx between electrodes 18/20 and monitor 40) to the characteristic flow speed "u" or $\tau_C$=L/u. The thermal diffusion timescale TD is governed by the thermal diffusivity "a" of fluid 12 and the characteristic length of a temperature gradient (which is the characteristic device length L in the instant case) where $\tau_D$=$L^2$/α. In the present invention, the structure of system 10 (e.g., conduit diameter, the distance Δx, etc.) is designed such that $\tau_C$<$\tau_D$ to insure that the generated thermal feature is convected downstream with a peak that remains intact and is detectable by monitor 40.

A processor 50 is coupled to current pulse source 22 and monitor 40 to track the time Δt between (i) the application of the current pulse to electrodes 18 and 20 at time $t_0$, and (ii) the detection of peak 32 by monitor 40 at time $t_1$. Since the propagation distance Δx is known, the velocity V of fluid 12 is readily determined by processor 50 using a conventional time-of-flight calculation.

Figure 2:
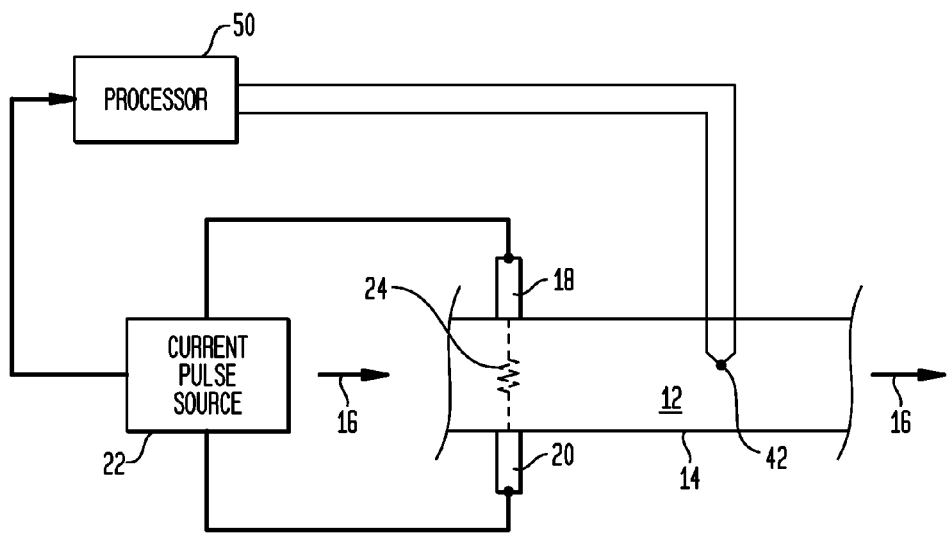
FIG. 2 is a schematic diagram of an embodiment of the system utilizing a thermocouple to detect the thermal feature.

Thermal feature monitor 40 can be realized using a simple temperature sensor (FIG. 2) or by using optical techniques (FIG. 3) when the temperature of the fluid is high (i.e., 300° C. or higher) such that the thermal feature produces thermal light emission (e.g., infra red emission) "visible" to photodiodes. In FIG. 2, thermal feature monitoring at the downstream location is accomplished with a thermocouple 42 placed in fluid 12 as shown. The output of thermocouple 42 is provided to processor 50 which detects the time of occurrence of the thermal feature's peak (i.e., peak 32 described above).

Figure 3:
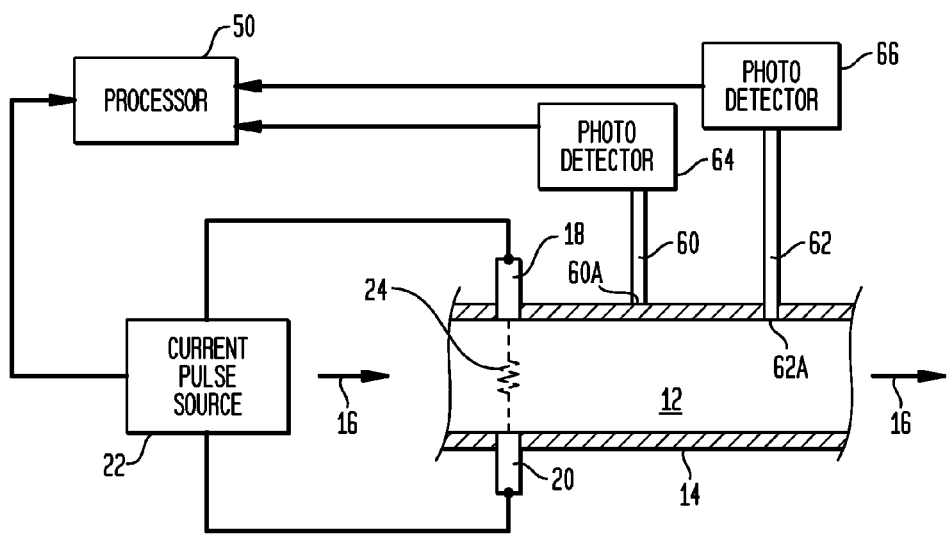
FIG. 3 is a schematic diagram of another embodiment of the system utilizing optical detection of the thermal feature.

In FIG. 3, thermal feature monitoring is accomplished in an optical fashion. This arrangement/method of monitoring is particularly effective when fluid 12 is maintained at high temperature of 300° C. or greater. For example, this is the case for molten bismuth propellant that is fed to Hall thrusters. At such elevated fluid temperatures, thermal light emission can be monitored as follows. In general, FIG. 3 illustrates a differential-type monitoring system where reference and measurement signals are differenced in order to eliminate system noise. More specifically, a first optical fiber 60 has its end face 60A coupled to the exterior surface of conduit 14. A second optical fiber 62 passes through an exterior wall of conduit 14 such that its end face 62A is aligned or is flush with the inside wall of conduit 14. Optical fiber 60 terminates at its opposite end in a photo detector 64 that generates an electrical signal indicative of the thermal light emission of conduit 14 as well as system noise. The output of photo detector 64 serves as a reference signal provided to processor 50. Optical fiber 62 monitors thermal light emission of fluid 12 as well as system noise. Optical fiber 62 terminates at its opposite end in a photo detector 66 that generates an electrical signal indicative of the thermal light emission of fluid 12 as well as system noise. The output of photo detector 66 is the measurement signal provided to processor 50. The signals from detectors 64 and 66 are differenced to eliminate steady-state and correlated system noise so that the thermal feature's peak can be readily detected as it is convected past end face 62A of optical fiber 62.

The advantages of the present invention are numerous. The fluid whose velocity is to be determined serves as a resistive heating element thereby eliminating the need to place a heater in the fluid flow. Further, no steady-state heating of the fluid is required. The absolute temperature of the fluid is unimportant since the present invention need only generate/detect a thermal feature peak. The optical monitoring embodiment further provides the advantage of elevated temperature operation and the elimination of all velocity measurement equipment from the fluid flow.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of determining velocity of a flowing fluid with the fluid being electrically conductive with finite resistivity, said method comprising the steps of:
    controlling the flowing fluid between an upstream and downstream location thereof to insure that a convection timescale of the flowing fluid is less than a thermal diffusion timescale of the flowing fluid between said upstream and downstream locations;
    coupling first and second nodes of a current-carrying circuit to the fluid at said upstream location wherein the flowing fluid passes between said first and second nodes;
    applying a current pulse to the current-carrying circuit wherein said current pulse travels through the flowing fluid to thereby generate a thermal feature in the flowing fluid at said upstream location, and wherein said thermal feature is convected to said downstream location;
    monitoring the fluid flow at said downstream location to detect a peak associated with said thermal feature so-convected; and
    determining velocity of the fluid flow using (i) the distance between said upstream and downstream locations, and (ii) the time between said step of applying and detection of said peak.

2. A method according to claim 1 wherein said step of coupling comprises the step of positioning said first and second nodes of the current-carrying circuit such that said current pulse travels through the flowing fluid in a direction that is perpendicular to the flowing fluid's direction of movement.

3. A method according to claim 1 wherein the fluid is bismuth.

4. A method according to claim 1 wherein said step of monitoring comprises the step of detecting said peak using a thermocouple positioned in the flowing fluid.

5. A method according to claim 1 wherein said step of monitoring comprises the step of optically detecting said peak from a position adjacent the fluid flow.

6. A method according to claim 1 wherein the fluid has a temperature of at least 300° C., and wherein said step of monitoring comprises the step of optically detecting thermal light emission associated with said thermal feature so-convected from a position adjacent the fluid flow.

7. A system for determining velocity of a flowing fluid with the fluid being electrically conductive with finite resistivity, comprising:

means for controlling the flowing fluid between an upstream and downstream location thereof to insure that a convection timescale of the flowing fluid is less than a thermal diffusion timescale of the flowing fluid between said upstream and downstream locations;

a current-carrying circuit having first and second nodes coupled to the fluid at said upstream location wherein the flowing fluid passes between said first and second nodes;

means for applying a current pulse to said current-carrying circuit wherein said current pulse travels through the flowing fluid to thereby generate a thermal feature in the flowing fluid at said upstream location, and wherein said thermal feature is convected to said downstream location;

means for monitoring the fluid flow at said downstream location to detect a peak associated with said thermal feature so-convected; and processing means for determining velocity of the fluid flow using (i) the distance between said upstream and downstream locations, and (ii) the time between application of said current pulse to said current-carrying circuit and detection of said peak.

8. A system as in claim 7 wherein said first and second nodes of said current-carrying circuit are positioned such that said current pulse travels through the flowing fluid in a direction that is perpendicular to the flowing fluid's direction of movement.

9. A system as in claim 7 wherein the fluid is bismuth.

10. A system as in claim 7 wherein said means for monitoring comprises a thermocouple positioned in the flowing fluid.

11. A system as in claim 7 wherein said means for monitoring comprises means for optically detecting said peak from a position adjacent the fluid flow.

12. A system as in claim 7 wherein the fluid has a temperature of at least 300° C., and wherein said means for monitoring comprises means for optically detecting thermal light emission associated with said thermal feature so-convected from a position adjacent the fluid flow.

13. A system for determining velocity of a flowing fluid with the fluid being electrically conductive with finite resistivity, comprising:

a conduit for transporting the flowing fluid between an upstream and downstream location thereof, said conduit being sized to insure that a convection timescale of the flowing fluid is less than a thermal diffusion timescale of the flowing fluid between said upstream and downstream locations;

first and second electrodes coupled to the flowing fluid at first and second opposing nodes of said conduit at said upstream location wherein the flowing fluid passes between said first and second electrodes;

means for applying a current pulse to one of said first and second electrodes wherein said current pulse travels through the flowing fluid to thereby generate a thermal feature in the flowing fluid at said upstream location, and wherein said thermal feature is convected to said downstream location;

means for monitoring the fluid flow at said downstream location to detect a peak associated with said thermal feature so-convected; and processing means for determining velocity of the fluid flow using (i) the distance between said upstream and downstream locations, and (ii) the time between application of said current pulse to one of said first and second electrodes and detection of said peak.

14. A system as in claim 13 wherein said first and second electrodes are positioned such that said current pulse travels through the flowing fluid in a direction that is perpendicular to the flowing fluid's direction of movement.

15. A system as in claim 13 wherein the fluid is bismuth.

16. A system as in claim 13 wherein said means for monitoring comprises a thermocouple positioned in the flowing fluid.

17. A system as in claim 13 wherein said means for monitoring comprises means for optically detecting said peak from a position adjacent the fluid flow.

18. A system as in claim 13 wherein the fluid has a temperature of at least 300° C., and wherein said means for monitoring comprises means for optically detecting thermal light emission associated with said thermal feature so-convected from a position adjacent the fluid flow.

19. A system as in claim 18 wherein said means for optically detecting said thermal light emission includes first and second optical detectors, said first optical detector including a reference optical fiber having an end coupled to said conduit at said downstream location, said second optical detector having a measurement optical fiber having an end exposed to the fluid flow at said downstream location, and wherein said thermal light emission associated with said thermal feature is indicated by a difference between outputs of said first and second optical detectors.

20. A system as in claim 19 wherein said end of said measurement optical fiber is aligned with an inside wall of said conduit.

* * * * *